US012682347B2

(12) United States Patent
Bergeon et al.

(10) Patent No.: US 12,682,347 B2
(45) **Date of Patent: \*Jul. 14, 2026**

(54) DYNAMICALLY CONFIGURABLE TRANSACTION MANAGEMENT CONTROLLER AND METHOD THEREOF

(71) Applicant: Worldpay, LLC, Symmes Township, OH (US)

(72) Inventors: Francois B. Bergeon, Scottsdale, AZ (US); Scot A. Bryant, Chandler, AZ (US); Coy A. Christensen, Scottsdale, AZ (US)

(73) Assignee: Worldpay, LLC, Symmes Township, OH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/302,203

(22) Filed: Apr. 18, 2023

(65) Prior Publication Data

US 2023/0252468 A1 Aug. 10, 2023

Related U.S. Application Data

(63) Continuation of application No. 17/446,227, filed on Aug. 27, 2021, now Pat. No. 11,657,395, which is a continuation of application No. 14/990,938, filed on Jan. 8, 2016, now Pat. No. 11,138,603.

(51) Int. Cl.
*G06Q 20/40* (2012.01)

(52) U.S. Cl.
CPC .................................... *G06Q 20/40* (2013.01)

(58) Field of Classification Search
None
See application file for complete search history.

(56) References Cited

U.S. PATENT DOCUMENTS

| | | | |
|---|---|---|---|
| 2007/0017971 A1\* | 1/2007 | Im ........................ | G06Q 20/381 235/383 |
| 2008/0189184 A1 | 8/2008 | Kubo et al. | |
| 2009/0299863 A1 | 12/2009 | Shah et al. | |
| 2009/0319382 A1\* | 12/2009 | Shah ...................... | G06Q 20/20 705/17 |
| 2011/0055033 A1 | 3/2011 | Chen et al. | |

(Continued)

*Primary Examiner* — Gregory S Cunningham, II
(74) *Attorney, Agent, or Firm* — Bookoff McAndrews, PLLC

(57) ABSTRACT

Technologies for managing payment authorization request messaging for payment transactions include a transaction management controller. The transaction management controller receives a transaction amount for a payment transaction from a business management engine and a payment transaction type from a point of interaction device. The transaction management controller initializes a transaction processing module that corresponds to the received payment transaction type. The transaction processing module defines payment processing parameters for processing payment transactions of the payment transaction type. One or more of the payment processing parameters are modified based on configuration data received from a remote configuration device. The transaction management controller processes the payment transaction as a function of the payment processing parameters. Other embodiments are described and claimed.

17 Claims, 5 Drawing Sheets

(56)          References Cited

U.S. PATENT DOCUMENTS

| | | |
|---|---|---|
| 2011/0251892 A1 | 10/2011 | Laracey |
| 2013/0124348 A1 | 5/2013 | Lal et al. |
| 2013/0268434 A1 | 10/2013 | Mohsenzadeh |
| 2014/0019352 A1 | 1/2014 | Shrivastava |
| 2014/0040145 A1* | 2/2014 | Ozvat .................. G06Q 20/401 |
| | | 705/64 |
| 2014/0180924 A1 | 6/2014 | Ozvat et al. |
| 2014/0222597 A1 | 8/2014 | Nadella et al. |
| 2015/0363757 A1 | 12/2015 | Mocko et al. |
| 2016/0148182 A1* | 5/2016 | Craine .............. G06Q 20/3278 |
| | | 705/16 |
| 2017/0011375 A1 | 1/2017 | Takasu |

* cited by examiner

DYNAMICALLY CONFIGURABLE TRANSACTION MANAGEMENT CONTROLLER AND METHOD THEREOF

CROSS-REFERENCE TO RELATED APPLICATION(S)

This patent application is a continuation of and claims the benefit of priority to U.S. Nonprovisional patent application Ser. No. 17/446,227, filed on Aug. 27, 2021, which is a continuation of U.S. application Ser. No. 14/990,938, now U.S. Pat. No. 11,138,603, filed on Jan. 8, 2016, the entireties of which are incorporated herein by reference.

TECHNICAL FIELD

Embodiments of the technologies described herein relate, in general, to the field of payment transactions. More particularly, the technologies described herein relate to the field of managing payment authorization request messaging for payment transactions.

BACKGROUND

Merchants accept consumer payments for goods and services through point-of-sale ("POS") terminals and corresponding business applications. Configuring such POS terminals and business applications to accept and process payment transactions is a complex and time consuming process. For example, conventional POS terminals and business applications must be configured to support and communicate with various different payment networks as well as a variety of different card readers and PIN pads. Such configuration typically requires sophisticated programming knowledge in connection with payment processing transactions. Additionally, POS terminals are increasingly being required to be certified by various payment networks, a process which is also complex and time consuming.

SUMMARY

In an embodiment, the present disclosure is directed, in part, to a method for managing payment authorization request messaging for payment transactions. The method includes receiving, by a transaction management controller and from a business management engine, a transaction amount for a payment transaction. The transaction amount can be for insertion by the transaction management controller into a payment authorization request message. The method further includes requesting, by the transaction management controller and from a point of interaction device, a payment transaction type corresponding to a payment card to be used for the payment transaction. In some embodiments of the method, the point of interaction device is communicatively isolated from the business management engine. The method further includes receiving, by the transaction management controller and from the point of interaction device, the payment transaction type. The method also includes initializing, by the transaction management controller, a transaction processing module that corresponds to the received payment transaction type. The transaction processing module can define transaction processing parameters for processing payment transactions that use payment cards of the payment transaction type. In addition, the method includes receiving, by the transaction management controller, a parameter modification message from a remote configuration device. The parameter modification message includes configuration data to modify one or more of the transaction processing parameters defined by the initialized transaction processing module. The method further includes processing, by the transaction management controller, the payment transaction as a function of the transaction processing parameters of the initialized transaction processing module.

In some embodiments of the method, processing the payment transaction includes requesting, by the transaction management controller and from the point of interaction device, payment card data for the payment authorization request message based on the transaction processing parameters of the initialized transaction processing module. The method of such embodiments further includes receiving, by the transaction management controller and from the point of interaction device, the requested payment card data for insertion by the transaction management controller into the payment authorization request message. In such embodiments, the method also includes inserting, by the transaction management controller, the payment card data received from the point of interaction device and the transaction amount received from the business management engine into the payment authorization request message. Additionally, the method of such embodiments further includes transmitting, by the transaction management controller and to a payment network, the payment authorization request message based on the transaction processing parameters of the initialized transaction processing module and receiving, by the transaction management controller and from the payment network, a payment authorization response message for the payment authorization request message. The method also includes transmitting, by the transaction management controller and to the business management engine, the payment authorization response message based on the transaction processing parameters of the initialized transaction processing module.

In another embodiment, the present disclosure is directed, in part, to one or more machine-readable storage media including a plurality of instructions stored thereon that in response to being executed by a transaction management controller, cause the transaction management controller to receive, from a business management engine, a transaction amount for a payment transaction. The transaction amount can be for insertion by the transaction management controller into a payment authorization request message. The plurality of instructions further cause the transaction management controller to request, from a point of interaction device, a payment transaction type corresponding to a payment card to be used for the payment transaction. In some embodiments, the point of interaction device is communicatively isolated from the business management engine. The plurality of instructions further cause the transaction management controller to receive, from the point of interaction device, the payment transaction type and initialize a transaction processing module that corresponds to the received payment transaction type. The transaction processing module can define transaction processing parameters for processing payment transactions that use payment cards of the payment transaction type. The plurality of instructions further cause the transaction management controller to receive a parameter modification message from a remote configuration device. The parameter modification message includes configuration data to modify one or more of the transaction processing parameters defined by the initialized transaction processing module. Additionally, the plurality of instructions further cause the transaction management controller to process the payment transaction as a function of the transaction processing parameters of the initialized transaction processing module.

In some embodiments of the one or more machine-readable storage media, the instructions that cause the transaction management controller to process the payment transaction include a plurality of instructions that cause the transaction management controller to request, from the point of interaction device, payment card data for the payment authorization request message based on the transaction processing parameters of the initialized transaction processing module. In such embodiments, the plurality of instructions also cause the transaction management controller to receive, from the point of interaction device, the requested payment card data for insertion by the transaction management controller into the payment authorization request message. Additionally, the plurality of instructions in such embodiments cause the transaction management controller to insert the payment card data received from the point of interaction device and the transaction amount received from the business management engine into the payment authorization request message. In addition, in such embodiments, the plurality of instructions further cause the transaction management controller to transmit, to a payment network, the payment authorization request message based on the transaction processing parameters of the initialized transaction processing module and receive, from the payment network, a payment authorization response message for the payment authorization request message. The plurality of instructions also cause the transaction management controller to transmit, to the business management engine, the payment authorization response message based on the transaction processing parameters of the initialized transaction processing module.

In another embodiment, the present disclosure is directed, in part, to a system for managing payment authorization request messaging for payment transactions. The system includes a transaction management controller having a processor executing instructions stored in memory. The instructions, when executed, cause the processor to receive, from a business management engine, a transaction amount for a payment transaction. The transaction amount can be for insertion by the transaction management controller into a payment authorization request message. The instructions further cause the processor to request, from a point of interaction device, a payment transaction type corresponding to a payment card to be used for the payment transaction. In some embodiments, the point of interaction device is communicatively isolated from the business management engine. The instructions further cause the processor to receive, from the point of interaction device, the payment transaction type and initialize a transaction processing module that corresponds to the received payment transaction type. The transaction processing module can define transaction processing parameters for processing payment transactions that use payment cards of the payment transaction type. The instructions further cause the processor to receive a parameter modification message from a remote configuration device. The parameter modification message includes configuration data to modify one or more of the transaction processing parameters defined by the initialized transaction processing module. Additionally, the instructions further cause the processor to process the payment transaction as a function of the transaction processing parameters of the initialized transaction processing module.

In some embodiments of the system, the instructions that cause the processor of the transaction management controller to process the payment transaction include instructions that cause the processor to request, from the point of interaction device, payment card data for the payment authorization request message based on the transaction processing parameters of the initialized transaction processing module. The instructions in such embodiments also cause the processor to receive, from the point of interaction device, the requested payment card data for insertion by the transaction management controller into the payment authorization request message. Additionally, in such embodiments, the instructions cause the processor to insert the payment card data received from the point of interaction device and the transaction amount received from the business management engine into the payment authorization request message. In addition, the instructions cause the processor to transmit, to a payment network, the payment authorization request message based on the transaction processing parameters of the initialized transaction processing module and receive, from the payment network, a payment authorization response message for the payment authorization request message. The instructions also cause the processor to transmit, to the business management engine, the payment authorization response message based on the transaction processing parameters of the initialized transaction processing module.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment can be combined with the features of other non-limiting embodiments. Such modifications and variations are intended to be included within the scope of the present disclosure.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment card can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Figure 1:
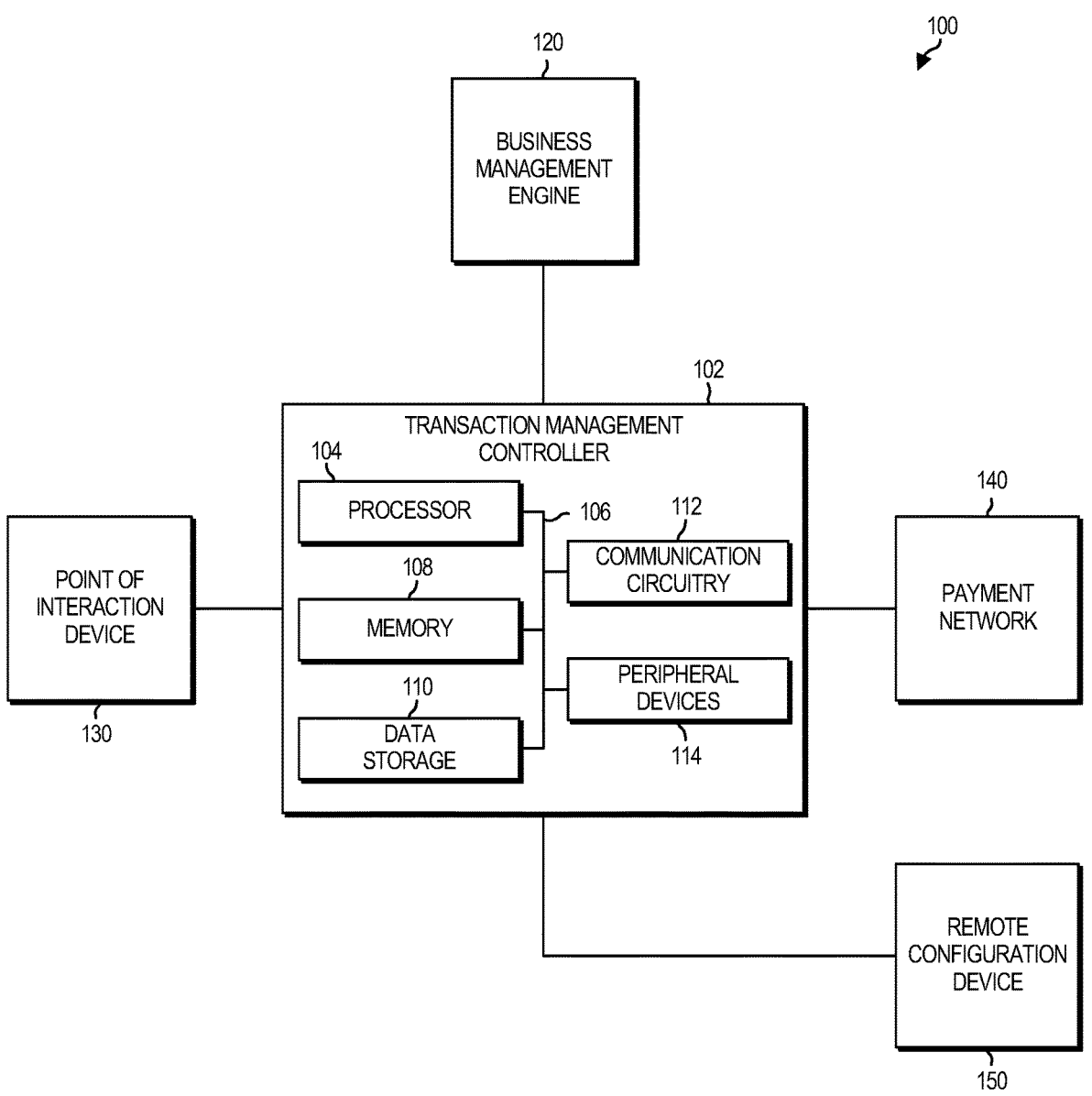
FIG. 1 is a simplified block diagram of at least one embodiment of a system for managing payment authorization request messaging for payment transactions.

Referring now to FIG. 1, in one embodiment, a system 100 for managing payment authorization request messaging for payment transactions includes a transaction management controller 102, a business management engine 120, a point of interaction (POI) device 130, a payment network 140, and a remote configuration device 150. In the illustrative embodiment, the POI device 130 is communicatively isolated from the business management engine 120. In operation, the transaction management controller 102 receives a payment request from the business management engine 120 in connection with a payment transaction. The payment request includes a transaction amount and can be embodied as a Hypertext Transfer Protocol (HTTP) message. After receiving the payment request, the transaction management controller 102 requests a payment transaction type from the POI device 130. The requested payment transaction type corresponds to the payment card or payment vehicle that is to be used for the payment transaction.

In response to receiving the requested payment transaction type from the POI device 130, the transaction management controller 102 dynamically loads or initializes a transaction processing module that corresponds to the received payment transaction type. The transaction processing module includes transaction processing parameters, rules, and/or instructions for processing payment transactions of the received payment transaction type. Subsequently, the transaction management controller 102 requests payment card data (e.g., a payment card number, etc.) for the payment transaction from the POI device 130 (e.g., via a card reader, a PIN pad, etc.) based on the transaction processing parameters of the initialized transaction processing module. Once the payment card data is received from the POI device 130, and based upon the transaction processing module loaded into the transaction management controller 102, the transaction management controller 102 inserts the received transaction amount and the payment card data into a payment authorization request message.

In some embodiments, only one transaction processing module can be loaded into the transaction management controller 102 at a time. It should be appreciated that by only loading the transaction processing module that corresponds to a particular type of payment transaction, the required computing resources (e.g., processing resources, memory resources, storage resources, power resources, etc.) of the transaction management controller 102 can be reduced. Additionally, by dynamically loading transaction processing modules at the time of a payment transaction, such transaction processing modules can be updated, added, or removed without requiring the base software environment and/or functionality of the transaction management controller 102 to be changed.

In the illustrative embodiment, the transaction management controller 102 receives a parameter modification message from the remote configuration device 150. The received parameter modification message includes configuration data (e.g., rules, values, settings, etc.) that defines the modification(s) that are to be made to one or more of the transaction processing parameters of the dynamically loaded transaction processing module. In such embodiments, the transaction management controller 102 can modify one or more of the parameters of the dynamically loaded transaction processing module based at least in part on, or otherwise as a function of, the configuration data of the received parameter modification message. In that way, the features and/or functionality of the dynamically loaded transaction processing module can be customized based on customer (e.g., a merchant, an independent software vendor, etc.) requirements or service subscriptions.

Additionally, in the illustrative embodiment, the transaction management controller 102 transmits the payment authorization request message to the payment network 140 based on the transaction processing parameters of the initialized transaction processing module. As described in more detail below, the payment network 140 can be embodied as, or otherwise include, a payment gateway (not shown). A payment authorization response message is then received from the payment network 140 (or the payment gateway) in response to the payment authorization request message. In some embodiments, the transaction management controller 102 transmits the received payment authorization response message to the business management engine 120 based on the transaction processing parameters of the initialized transaction processing module.

In some embodiments, the transaction management controller 102 is configured to interface with and control features and/or functionality of the POI device 130. For example, in some embodiments, the transaction management controller 102 can be configured to control selectable options (e.g., payment card type selections, cashback selections, transaction amount verification, language selections, etc.) that are to be displayed to a consumer via the POI device 130. Additionally or alternatively, the transaction management controller 102 can be configured to control payment transaction processing features (e.g., signature prompting features, PIN entry features, customized informational display screens, scrolling receipt features, etc.) provided by the POI device 130. It should be appreciated that, as discussed in more detail below, the transaction management controller 102 can perform or provide any or all of those features and/or functionality based on the transaction processing parameters of the initialized transaction processing module.

The transaction management controller 102 can be embodied as any type of computing device or server or capable of processing, communicating, storing, maintaining, and transferring data. For example, the transaction management controller 102 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the transaction management controller 102 can be embodied as a computing device integrated with other systems or subsystems. In the illustrative embodiment of FIG. 1, the transaction management controller 102 includes a processor 104, a system bus 106, a memory 108, a data storage 110, communication circuitry 112, and one or more peripheral devices 114. Of course, the transaction management controller 102 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 108, or portions thereof, can be incorporated in the processor 104 in some embodiments. Furthermore, it should be appreciated that the transaction management controller 102 can include other components, sub-components, and devices commonly found in a computer and/or computing device, which are not illustrated in FIG. 1 for clarity of the description.

The processor 104 can be embodied as any type of processor capable of performing the functions described herein. For example, the processor 104 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the transaction management controller 102 includes a system bus 106 for interconnecting the various components of the transaction management controller 102. The system bus 106 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 104, the memory 108, and other components of the transaction management controller 102. In some embodiments, the transaction management controller 102 can be integrated into one or more chips such as a programmable logic device or an application specific integrated circuit (ASIC). In such embodiments, the system bus 106 can form a portion of a system-on-a-chip (SoC) and be incorporated, along with the processor 104, the memory 108, and other components of the transaction management controller 102, on a single integrated circuit chip.

The memory 108 can be embodied as any type of volatile or non-volatile memory or data storage capable of performing the functions described herein. For example, the memory 108 can be embodied as read only memory (ROM), random access memory (RAM), cache memory associated with the processor 104, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 108 can store various data and software used during operation of the transaction management controller 102 such as operating systems, applications, programs, libraries, and drivers.

The data storage 110 can be embodied as any type of device or devices configured for short-term or long-term storage of data such as, for example, memory devices and circuits, memory cards, hard disk drives, solid-state drives, or other data storage devices. For example, in some embodiments, the data storage 110 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 104, or the memory 108 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage device 110 can be configured to store one or more transaction processing modules. Each transaction processing module defines one or more transaction processing parameters for processing payment transactions of a different payment transaction type. For example, one transaction processing module can include transaction processing parameters for processing credit transactions, another transaction processing module can include transaction processing parameters for processing debit transactions, and another transaction processing module can include transaction processing parameters for processing chip-based payment transactions. It should be appreciated that the data storage device 110 can store any number of additional transaction processing modules for processing payment transactions of a variety of other transaction types. It should also be appreciated that in other embodiments, all or a portion of the transaction processing modules can be stored remotely by another computing device such as, for example, the remote configuration device 150.

In some embodiments, the transaction processing parameters for each transaction processing module can be embodied as, or otherwise include, one or more rules or instructions for processing payment transactions of a particular type. In such embodiments, the instructions or rules of the transaction processing parameters, once loaded into or initialized by the transaction management controller 102, can be configured to cause the transaction management controller 102 to perform one or more transaction type-specific processing functions and/or control or manage one or more transaction type-specific functions of other devices of the system 100 (or the systems 200, 300 illustratively shown in FIGS. 2 and 3). For example, the instructions or rules of a particular transaction processing module can be configured to cause the transaction management controller 102 to initialize a signature prompt feature on the POI device 130, initialize a PIN entry feature on the POI device 130, route payment authorization request messages to a particular payment network 140 (e.g., a VISA payment network, a MASTER-CARD payment network, a DISCOVER payment network, an AMERICAN EXPRESS payment network, etc.), route payment authorization request messages to a payment transaction type-specific payment gateway communicatively coupled to the payment network 140, and/or initialize a payment transaction type-specific processing feature on the POI device 130.

It should be appreciated that, in some embodiments, the instructions or rules (e.g., the transaction processing parameters) of a particular transaction processing module can cause the transaction management controller 102 to provide and/or perform different or additional transaction type-specific processing functions or features (e.g., partial approval features, transaction amount confirmation features, cashback features, accepted payment card settings, supported language settings, transaction gratuity features, signature requirement features, transaction store and forward features, etc.). Additionally, in some embodiments, the transaction processing parameters for each transaction processing module can also be embodied as, or otherwise include, device configuration features and/or settings (e.g., listening port settings, security settings, user settings, etc.), multilane features and/or settings (e.g., lane identification features, lane initialization settings, etc.), POI device 130 features and/or settings (e.g., terminal type settings, driver configurations, communication settings, etc.), and any other type of payment processing feature or configuration setting for the transaction management controller 102 or a device controlled or managed thereby (e.g., the POI device 130). In that way, each dynamically loadable transaction processing module can be configured to cause the transaction management controller 102 to perform specific transaction processing functions, or provide specific transaction processing features, that are required or preferred when processing a particular type of payment transaction.

Additionally or alternatively, in some embodiments, one or more of the dynamically loadable transaction processing modules can be embodied as default, base, standardized, or common transaction processing modules. In such embodiments, each of the dynamically loadable transaction processing modules can include a different set of transaction processing parameters in which all or one or more of the transaction processing parameters are initially disabled or deactivated by default. As discussed in more detail below, one or more of the initially disabled or deactivated transaction processing parameters can be enabled, activated, or toggled "on" in response to a parameter modification message received from the remote configuration device 150. Additionally, in some embodiments, all or one or more of the transaction processing parameters of a dynamically loaded transaction processing module can be initially enabled or activated by default. In such embodiments, one or more of the initially enabled or activated transaction processing parameters can be disabled, deactivated, or toggled "off" in response to a parameter modification message received from the remote configuration device 150. In that way, the features and/or functionality of a dynamically loaded transaction processing module can be customized based on customer (e.g., a merchant, an independent software vendor, etc.) requirements or service subscriptions.

The communication circuitry 112 of the transaction management controller 102 can be embodied as any type of communication circuit, device, interface, or collection thereof, capable of enabling communications between the transaction management controller 102 and the business management engine 120, POI device 130, payment network 140, remote configuration device 150, and/or any other computing device communicatively coupled thereto. For example, the communication circuitry 112 can be embodied as one or more network interface controllers (NICs), in some embodiments. The communication circuitry 112 can be configured to use any one or more communication technologies (e.g., wireless or wired communications) and associated protocols (e.g., Ethernet, Wi-Fi®, WiMAX, etc.) to effect such communication.

In some embodiments, the transaction management controller 102, business management engine 120, POI device 130, payment network 140, remote configuration device 150, and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100.

Additionally, in some embodiments, the transaction management controller 102 can further include one or more peripheral devices 114. Such peripheral devices 114 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

The business management engine 120 can be embodied as any type of computing device capable of performing the functions described herein. As such, the business management engine 120 can include devices and structures commonly found in computing devices such as processors, memory devices, communication circuitry, and data storages, which are not shown in FIG. 1 for clarity of the description. The business management engine 120 can be configured to perform certain business-related functions, such as, without limitation, sales tabulation, inventory management, scheduling, accounting processes, payroll, and the like. As is to be appreciated, the particular business-related functions facilitated by a business management engine can depend on the needs of the particular business (e.g., merchant) utilizing the business management engine. In this regard, a business management engine of a salon can provide different business-related functions than that of a specialty retailer, for example. In some embodiments, the business management engine 120 is configured to initiate payment transactions. As discussed in more detail below, the business management engine 120 is configured to communicate with the transaction management controller 102 to facilitate such payment transactions. For example, in some embodiments, the business management engine 120 is configured to transmit a payment request to the transaction management controller 102. The payment request can be embodied as an HTTP message that includes the amount of the transaction. Additionally, the business management engine 120 can be configured to receive a payment authorization response message from the transaction management controller 102. As discussed in more detail below, the business management engine 120 can be communicatively isolated from the POI device 130 (e.g., not in direct communication with the POI device 130). As such, instead of being directly connected to the POI device 130, the business management engine 120 is communicatively coupled to the transaction management controller 102, which manages communications with the POI device 130. It should be appreciated that in doing so, the complexity of configuring (e.g., coding, certification, initialization, etc.) of the business management engine 120 is reduced.

Additionally, in some embodiments, the business management engine 120 can transmit data to the transaction management controller 102 for subsequent display on the POI device 130 during a purchase or payment transaction. For example, in some embodiments, the business management engine 120 can be configured to transmit scrolling receipt data to the transaction management device 102. In turn, the transaction management device 102 can transmit the scrolling receipt data to the POI device 130. In such embodiments, the scrolling receipt data can include product scan data (e.g., product identifiers, product names, product descriptions, etc.) and product sales price data. It should be appreciated that the scrolling receipt data can include any other type of data associated with a purchase or payment transaction.

The point of interaction (POI) device 130 can be embodied as any type of computing or payment device capable of performing the functions described herein. For example, in the illustrative embodiment, the POI device 130 can be embodied as a card reader or a PIN pad configured to facilitate receipt of a payment card for a payment transaction (e.g., a credit or debit transaction). The POI device 130 can include devices and structures commonly found in computing and payment devices such as processors, memory devices, communication circuitry, and data storages, which are not shown in FIG. 1 for clarity of the description. For example, in some embodiments, the POI device 130 can include payment hardware and functionality configured for receiving traditional payment cards containing magnetic stripes (e.g., magstripes, swipe cards, etc.). The POI device 130 can also include payment hardware and functionality configured for receiving payment cards via Near Field Communication (NFC) technologies, BLUETOOTH communication technologies, and other contactless and/or short-range wireless communication technologies. Additionally or alternatively, in some embodiments, the POI device 130 can include integrated circuit payment hardware and functionality configured for receiving a EUROPAY, MASTER-CARD, AND VISA (EMV) payment card or other smartcard or chip-based card. Of course, the POI device 130 can include any other type of payment hardware and functionality for receiving a payment card or vehicle.

As discussed, in some embodiments, the POI device 130 is communicatively isolated from the business management engine 120. In such embodiments, the POI device 130 instead communicates directly with the transaction management controller 102 via a wired or wireless communication link (i.e., a point-to-point link, bus link, wire, cable, light guide, wireless link, etc.). As such, the POI device 130 can be controlled by the transaction management controller 102, which can include the necessary drivers to do so.

The payment network 140 can be, for example, a network of a credit card association affiliated with a payment vehicle or payment card (e.g., credit cards, debit cards, smart cards, single-use cards, prepaid cards, electronic benefit transfer card, electronic currency, etc.), which generally refers to any type of financial alternative to currency. Non-limiting examples of credit card associations include VISA, MAS-TERCARD, DISCOVER, and AMERICAN EXPRESS. In some embodiments, the payment network 140 receives a payment authorization request message from the transaction management controller 102 for a payment transaction. The payment network 140 can provide the payment authorization request message to a payment processing server of an issuer processor, which in turn can provide the payment authorization request message to an issuer financial institution. The issuer financial institution can then associate the payment vehicle or payment card used with an account held by the issuer financial institution. Thereafter, the issuer financial institution can transmit a payment authorization response message to the payment network 140 via the issuer processor. In response to receiving the payment authorization response message, the payment network 140 can transmit the payment authorization response message to the transaction management controller 102. In some embodiments, the payment network 140 includes a payment gateway (not shown) configured to facilitate the transaction management controller 102 or, more generally, merchants in processing payment transactions.

The remote configuration device 150 can be embodied as any type of computing device capable of performing the functions described herein. As such, the remote configuration device 150 can include devices and structures commonly found in computing devices such as processors, memory devices, communication circuitry, and data storages, which are not shown in FIG. 1 for clarity of the description. In some embodiments, the remote configuration device 150 can be embodied as any type of configuration device such as the one described in commonly-owned U.S. patent application Ser. No. 14/755,320, entitled "CONFIG-URABLE TRANSACTION MANAGEMENT CONTROL-LER AND METHOD THEREOF," which is hereby incorporated by reference in its entirety. In the illustrative embodiments, the remote configuration device 150 is configured to manage and/or maintain one or more transaction processing modules, which can be locally stored in a storage device of the remote configuration device 150 or remotely stored in the data storage device 110 of the transaction management controller 102 (or the multiple transaction management controllers 312, 322 of FIG. 3). To do so, the remote configuration device 150 can be configured to update or replace one or more of the transaction processing modules. Additionally or alternatively, the remote configuration device 150 can be configured to add new transaction processing modules. In embodiments in which one or more transaction processing modules are stored in the data storage device 110 of the transaction management controller 102, the remote configuration device 150 can be configured to transmit a new or updated transaction processing module to the transaction management controller 102. As discussed, each transaction processing module defines one or more transaction processing parameters for processing payment transactions of a different payment transaction type. The transaction processing parameters for each transaction processing module can be embodied as, or otherwise include, one or more rules or instructions for processing payment transactions of a particular type.

The remote configuration device 150 is also configured to manage and/or configure the transaction processing parameters of the transaction processing modules dynamically loaded or initialized by the transaction management controller 102. To do so, the remote configuration device 150 is configured to transmit a parameter modification message to the transaction management controller 102 after a transaction processing module has been dynamically loaded or initialized. The parameter modification message includes configuration data that specifies modifications that are to be made to one or more of the transaction processing parameters. For example, in some embodiments, the configuration data of the parameter modification message can include rules, values, and/or settings that cause the transaction management controller 102 to toggle "on" or toggle "off"

one or more of the transaction processing parameters of a transaction processing module dynamically loaded or initialized. In that way, the features and/or functionality of the dynamically loaded transaction processing module can be customized based on customer (e.g., a merchant, an independent software vendor, etc.) requirements or service subscriptions.

In some embodiments, the transaction management controller 102, the business management engine 120, the POI device 130, the payment network 140 (or computing devices thereof), and the remote configuration device 150 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 2:
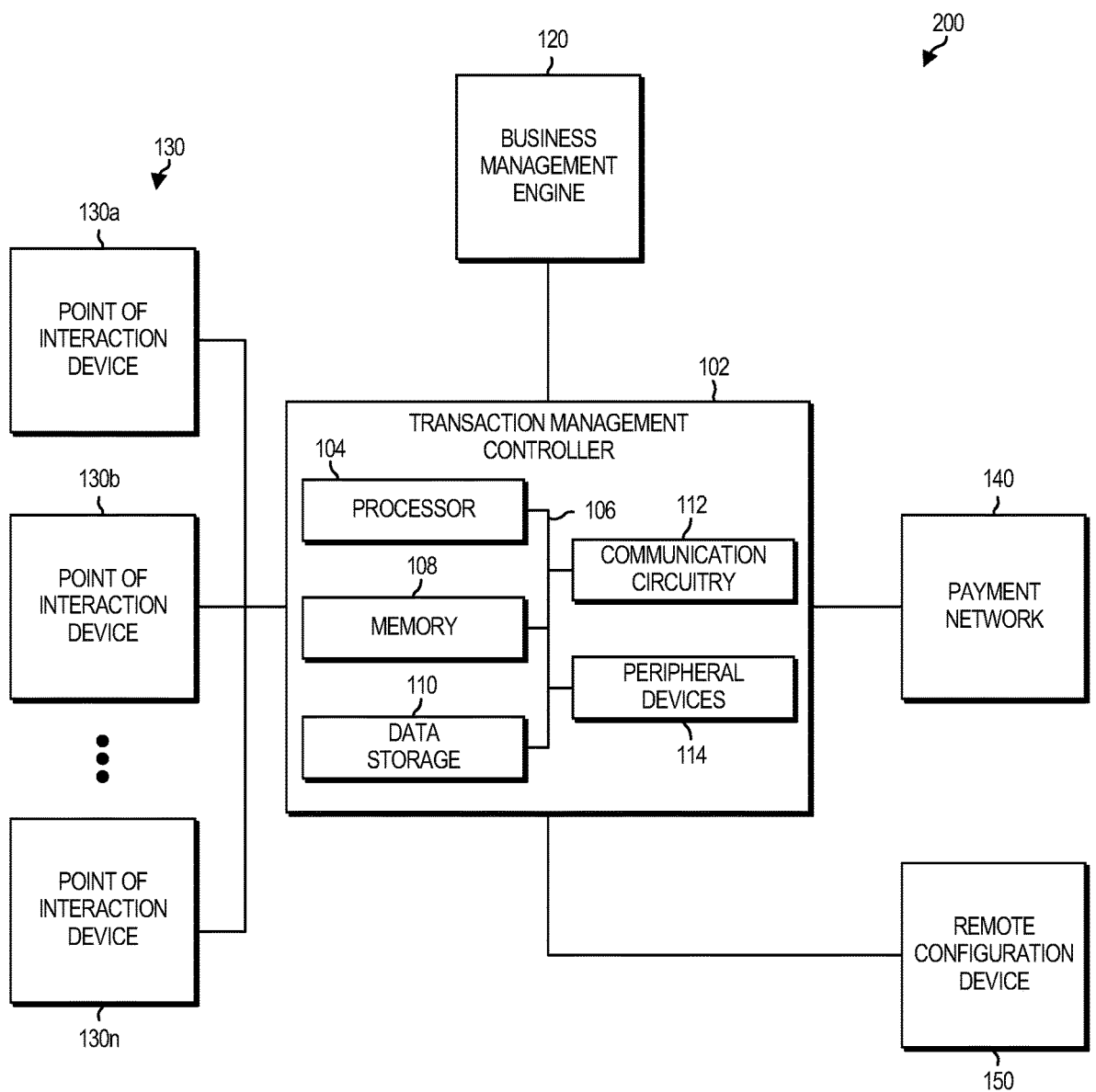
FIG. 2 is a simplified block diagram of at least one embodiment of a system for managing payment authorization request messaging for multi-lane payment transactions.

Referring now to FIG. 2, in an embodiment, a system 200 for managing payment authorization request messaging for multi-lane payment transactions includes the transaction management controller 102, the business management engine 120, multiple point of interaction (POI) devices 130 (e.g., the POI device 130a, POI device 130b, POI device 130n, etc.), the payment network 140, and the remote configuration device 150. As illustratively shown, the transaction management controller 102 can manage and, therefore, be communicatively coupled to multiple POI devices 130. Each POI device 130 (e.g., the POI device 130a, POI device 130b, POI device 130n, etc.) of the system 200 can be embodied as a different "lane" in a multi-lane environment. As such, it should be appreciated that each of the devices illustratively shown in FIG. 2 can be substantially similar to the devices illustratively shown and described with respect to FIG. 1.

Figure 3:
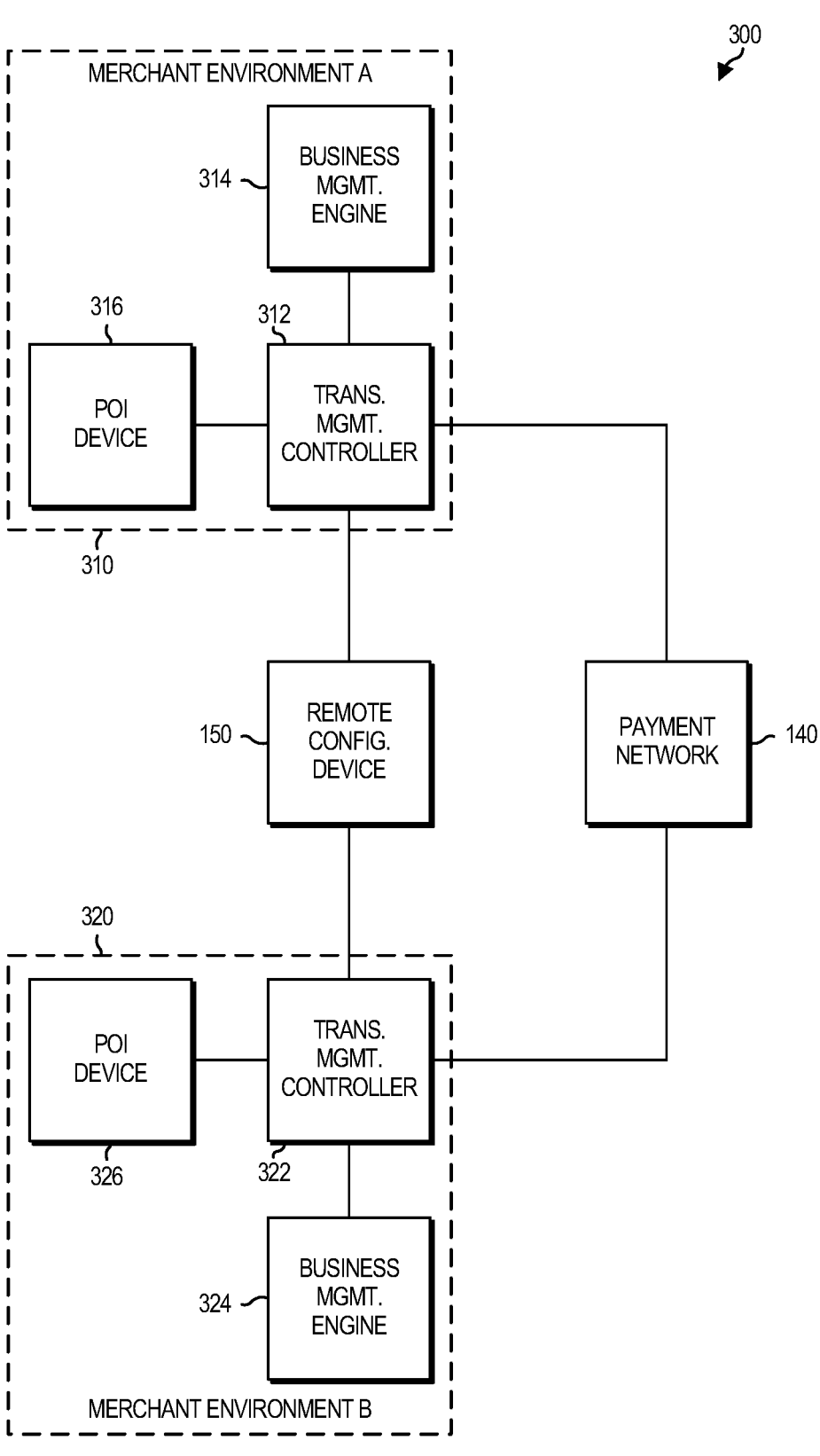
FIG. 3 is a simplified block diagram of at least one embodiment of a system for remotely configuring transaction management controllers.

Referring now to FIG. 3, in an embodiment, a system 300 for configuring multiple transaction management controllers includes the remote configuration device 150 and the payment network 140. The system 300 also includes a transaction management controller 312, a business management engine 314, and a POI device 316 of one merchant environment (e.g., the merchant environment A 310) and a transaction management controller 322, a business management engine 324, and a POI device 326 of another merchant environment (e.g., the merchant environment B 320). It should be appreciated that the transaction management controllers 312, 322, business management engines 314, 324, POI devices 316, 326, payment network 140, and remote configuration device 150 of the system 300 can be substantially similar to the transaction management controller 102, business management engine 120, POI device 130, payment network 140, and remote configuration device 150 of the system 100 of FIG. 1. In the illustrative embodiment, however, the remote configuration device 150 is configured to selectively manage and/or maintain transaction processing modules and the corresponding transaction processing parameters for multiple transaction management controllers (e.g., the transaction management controllers 312, 322).

Figure 4:
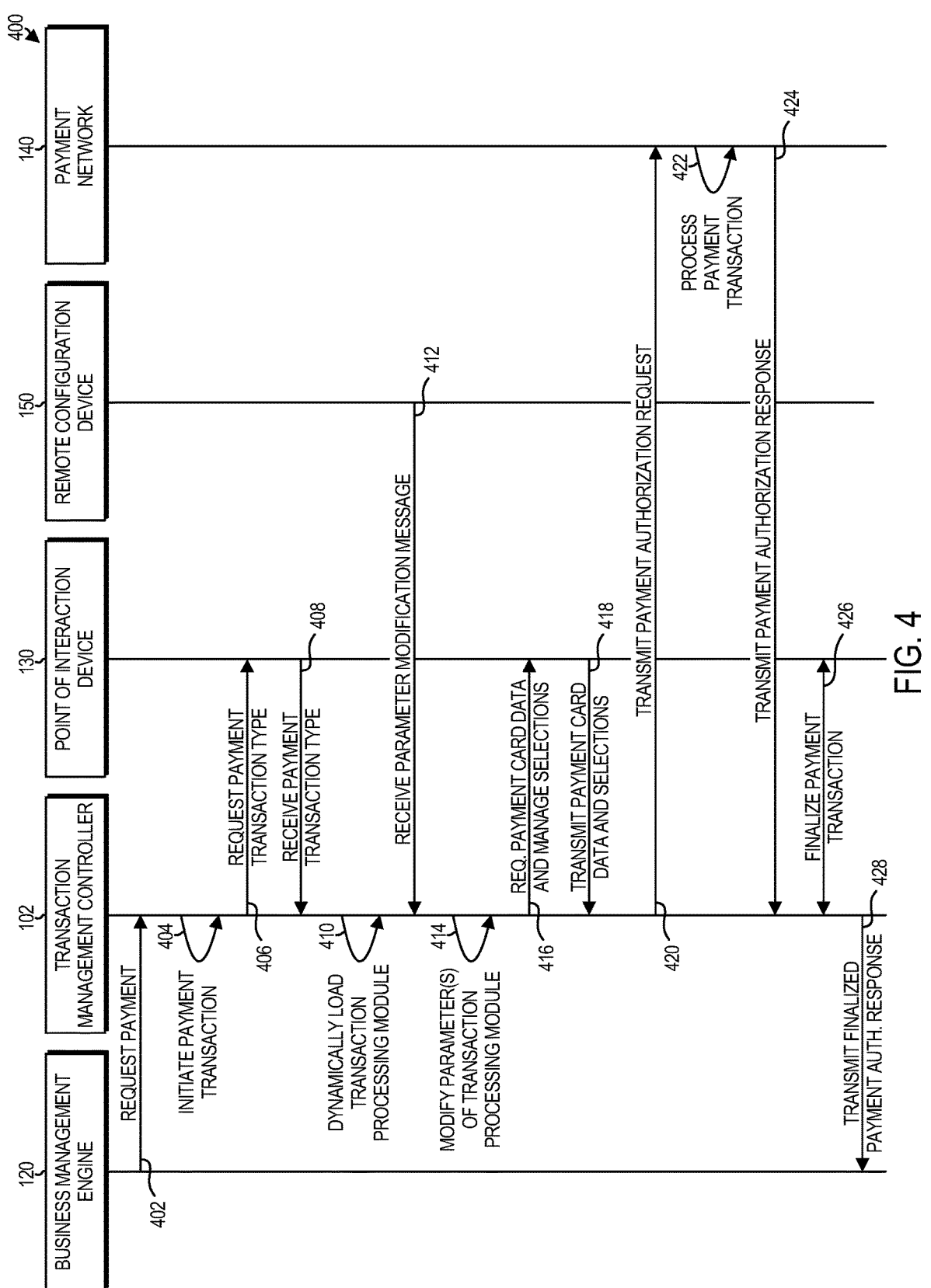
FIG. 4 is a simplified sequence flow diagram in accordance with at least one non-limiting embodiment.

Referring now to FIG. 4, a process 400 that can be executed by the devices of the system 100 begins with process flow 402. In process flow 402, the business management engine 120 transmits a payment request to the transaction management controller 102. The payment request includes a transaction amount and can be embodied as a Hypertext Transfer Protocol (HTTP) message. In embodiments in which the payment request is an HTTP message, the payment request can be embodied as an HTTP POST request or an HTTP PUT request. In such embodiments, one or more payment request parameters (e.g., transaction amount, payment type, etc.) can be sent to the transaction management controller 102 within a uniform resource locator (URL) that corresponds to the transaction management controller 102. Additionally or alternatively, the payment request can be embodied as an HTTP GET request or an HTTP DELETE request. In such embodiments, one or more of the payment request parameters can be sent to the transaction management controller 102 within the body of the HTTP message sent to the transaction management controller 102. Next, in process flow 404, the transaction management controller 102 initiates a payment transaction based at least in part on, or otherwise as a function of, the received payment request.

In process flow 406, the transaction management controller 102 requests a payment transaction type from the POI device 130. Subsequently, in process flow 408, the transaction management controller 102 receives the requested payment transaction type from the POI device 130. The requested payment transaction type can correspond to the type of payment card that will be used for the payment transaction. For example, if a credit card or a charge card will be used for the payment transaction, the corresponding payment transaction type can be embodied as a credit transaction or a charge transaction, respectively. In another example, if a debit card will be used for the payment transaction, the corresponding payment transaction type can be embodied a debit transaction. In other examples, if a prepaid card, a stored value-card, or an electronic benefit transfer card will be used for the payment transaction, the corresponding payment transaction type can be a prepaid transaction, a stored-value transaction, or an electronic benefit transfer transaction, respectively. It should be appreciated that the payment transaction type can be embodied as any other type of payment transaction corresponding to any type of payment card or financial alternative to currency.

In some embodiments, to facilitate requesting and receiving the payment transaction type, the transaction management controller 102 transmits one or more instructions to the POI device 130 that cause the POI device 130 to display selectable options to a user or consumer. Each selectable option can correspond to a different payment transaction type. In such embodiments, the payment transaction type selected by the user or consumer can be received by the transaction management controller 102. In other embodiments, the transaction management controller 102 can request and receive payment card data from the POI device 130. In such embodiments, the transaction management controller 102 can determine the payment transaction type based at least in part on, or otherwise as a function of, the payment card data. For example, in some embodiments, payment card data received by the transaction management controller 102 can include a payment card number or an account number. In such cases, the transaction management controller 102 can analyze or parse the payment card number to determine and/or extract a bank identification number (BIN) therefrom. The BIN can be used by the transaction management controller 102 to determine the payment transaction type, in some embodiments. It should be appreciated that the transaction management controller 102 can also utilize any other process or technique to determine the payment transaction type based on data received from the POI device 130.

In process flow 410, the transaction management controller 102 dynamically loads the transaction processing module that corresponds to the payment transaction type. To do so, the transaction management controller 102 executes or initializes the transaction processing module. The transaction processing modules can be stored locally in the data storage device 110 of the transaction management controller 102. One or more of the transaction processing modules can also be stored remotely by a different computing device such as, for example, the remote configuration device 150. In either case, the transaction management controller 102, in process flow 410, retrieves or otherwise obtains the transaction processing module corresponding to the payment transaction type from a data storage device. It should be appreciated that by only loading the transaction processing module that corresponds to a particular type of payment transaction, the required computing resources of the transaction management controller 102 can be reduced. Additionally, by dynamically loading transaction processing modules at the time of a payment transaction, such transaction processing modules can be updated, added, or removed without requiring the base software environment and/or functionality of the transaction management controller 102 to be changed.

As discussed, each transaction processing module defines one or more transaction processing parameters for processing payment transactions of a different payment transaction type. In some embodiments, one or more of the transaction processing parameters of the dynamically loaded transaction processing module can be initially enabled or initially disabled by default. In such embodiments, in process flow 412, the transaction management controller 102 receives a parameter modification message from the remote configuration device 150 or another remote computing device. The parameter modification message includes configuration data that specifies modifications that are to be made to one or more of the transaction processing parameters of the dynamically loaded transaction processing module. For example, in some embodiments, the configuration data of the parameter modification message can include rules, values, and/or settings that cause the transaction management controller 102 to toggle "on" (e.g., activate or enable) or toggle "off" (e.g., deactivate or disable) one or more of the transaction processing parameters of the dynamically loaded transaction processing module.

In some embodiments, the transaction management controller 102 automatically receives the parameter modification message from the remote computing device. For example, in embodiments in which the transaction processing module corresponding to the payment transaction type is received or obtained from the remote configuration device 150, the remote configuration device 150 can be configured to automatically transmit the parameter modification message to the transaction management controller 102 after transmission of the transaction processing module. Additionally or alternatively, in some embodiments, the transaction management controller 102 can also request the parameter modification message from the remote configuration device 150 after dynamically loading or initializing the transaction processing module corresponding to the payment transaction type.

In process flow 414, the transaction management controller 102 modifies the one or more transaction processing parameters of the dynamically loaded transaction processing module based at least in part on, or otherwise as a function of, the configuration data of the received parameter modification message. To do so, the transaction management controller 102 toggles "on" (e.g., activates or enables) or toggles "off" (e.g., deactivates or disables) the one or more transaction processing parameters of the dynamically loaded transaction processing module. In that way, the features and/or functionality of the dynamically loaded transaction processing module can be customized based on customer (e.g., a merchant, an independent software vendor, etc.) requirements or service subscriptions.

In process flow 416, once the appropriate transaction processing module is loaded or initialized and any modifications to the transaction processing parameter(s) have been applied, the transaction management controller 102 requests payment card data for the initiated payment transaction from the POI device 130 based on the transaction processing parameters of the initialized transaction processing module. For example, in some embodiments, the transaction management controller 102 manages payment selection options provided to a consumer via the POI device 130 based on the transaction processing parameters included in the initialized transaction processing module. As discussed, the transaction processing parameters of the initialized transaction processing module can be embodied as, or otherwise include, one or more rules or instructions for processing payment transactions that correspond to the payment transaction type.

In process flow 418, the POI device 130 transmits the payment card data to the transaction management controller 102. The payment card data can be captured by the POI device 130 in response to receipt of the request from the transaction management controller 102. Additionally, in embodiments in which the transaction management controller 102 manages the payment selection options provided to the consumer during the payment transaction, the selected options can be transmitted by the POI device 130 to the transaction management controller 102.

Subsequently, in process flow 420, the transaction management controller 102 transmits transaction data for the payment transaction to the payment network 140 for processing based on the transaction processing parameters included in the initialized transaction processing module as well as the parameters that were later modified. To do so, the transaction management controller inserts or incorporates the transaction amount received from the business management engine 120 and the payment card data received from the POI device 130 into a payment authorization request message. In some embodiments, the payment authorization request message can be embodied as a HTTP message. Additionally, in some embodiments, the payment network 140 includes a payment gateway. In such embodiments, the payment gateway is configured to receive the payment authorization request message from the transaction management controller 102.

In process flow 422, the payment network 140 processes the payment transaction based on the payment authorization response message received from the transaction management controller 102. As discussed, the payment network 140 is configured to receive and forward the payment authorization request message to an issuer financial institution via an issuer processor. Thereafter, the issuer financial institution associates the received payment card number with an account held and/or maintained by the issuer financial institution. After associating the received payment card number with an account, the issuer financial institution generates a payment authorization response message. The payment authorization response message can then be transmitted to the payment network 140 via the issuer processor.

Next, in process flow 424, the payment network 140 (or the payment gateway of the payment network 140) transmits the received payment authorization response message to the transaction management controller 102.

Subsequently, in process flow 426, the transaction management controller 102 and the POI device 130 finalize the payment transaction and, in some embodiments, the payment authorization response message. For example, in some embodiment, the transaction management controller 102 can instruct the POI device 130 to capture a signature for the payment transaction. Additionally or alternatively, in some embodiments, an integrated circuit payment card (e.g., an EMV card or other smartcard) can be inserted into the POI device 130, which can include corresponding integrated circuit payment hardware and functionality. In such embodiments, the transaction management controller 102 can instruct the POI device 130 to write payment transaction data or account data back to the integrated circuit payment card. In some embodiments, finalization of the payment transaction can be performed at least in part by the transaction management controller 102. Such finalization can be based on the transaction processing parameters originally included in the initialized transaction processing module as well as those that are later modified. It should be appreciated that the transaction management controller 102 and the POI device 130 can perform any other function to finalize the payment transaction.

In process flow 428, the transaction management controller 102 transmits the finalized payment authorization response message to the business management engine 120 based on the transaction processing parameters (e.g., the original payment processing parameters and the modified payment processing parameters) included in the initialized transaction processing module. In some embodiments, the business management engine 120 generates a receipt for the payment transaction based at least in part on, or otherwise as a function of, the finalized payment authorization response message received from the transaction management controller 102.

Figure 5:
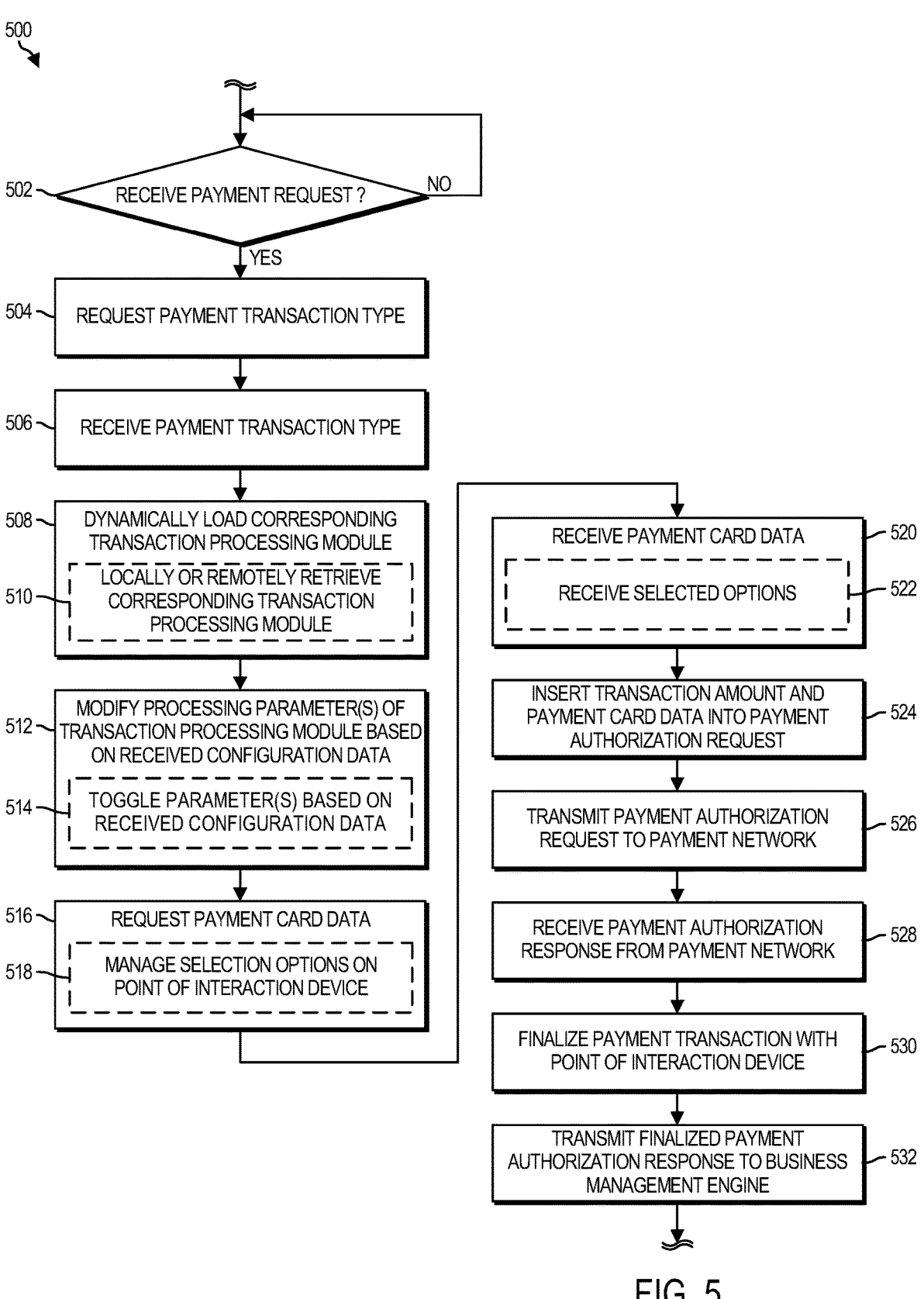
FIG. 5 is a simplified flow diagram of at least one embodiment of a method that can be executed by the transaction management controller of FIG. 1 for managing payment authorization request messaging for payment transactions.

Referring now to FIG. 5, a method 500 that can be executed by the transaction management controller 102 for managing payment authorization request messaging for payment transactions begins with decision block 502. In decision block 502, the transaction management controller 102 determines whether a payment request for a payment transaction is received from the business management engine 120. The payment request can include a transaction amount and can be embodied as a Hypertext Transfer Protocol (HTTP) message. If, in decision block 502, the transaction management controller 102 determines that a payment request is received, the method 500 advances to block 504. If, however, the transaction management controller 102 determines instead that a payment request is not received, the method 500 loops back to decision block 502 and the transaction management controller 102 continues monitoring for receipt of a payment request.

In block 504, the transaction management controller 102 requests a payment transaction type from the POI device 130. To do so, in some embodiments, the transaction management controller 102 transmits a request message to the POI device 130. In such embodiments, the transaction management controller 102 can generate and subsequently transmit the request message to the POI device 130 in response to a determination that a payment request is received. Additionally or alternatively, the transaction management controller 102 can generate and subsequently transmit the request message to the POI device 130 in response to a notification received from POI device 130 indicating that a payment card or a payment card number has been received by the POI device. Subsequently, in block 506, the transaction management controller 102 receives the requested payment transaction type from the POI device 130. As discussed, the requested payment transaction type can correspond to the type of payment card that will be used for the payment transaction.

In block 508, the transaction management controller 102 dynamically loads the transaction processing module that corresponds to the payment transaction type. To do so, the transaction management controller 102 executes or initializes the transaction processing module. In some embodiments, in block 510, the transaction management controller 102 retrieves or otherwise locally obtains the transaction processing module corresponding to the payment transaction type from the data storage device 110 of the transaction management controller 102. Additionally or alternatively, in block 510, the transaction management controller 102 obtains the transaction processing module corresponding to the payment transaction type from a remote data storage device such as, for example, a data storage device of the remote configuration device 150 or another remote computing device. As discussed above, the dynamically loaded transaction processing module includes one or more transaction processing parameters, rules, and/or instructions for processing payment transactions of the received payment transaction type. Such parameters, rules, and/or instructions can be configured to cause the transaction management controller 102 to perform one or more transaction type-specific processing functions and/or control or manage one or more transaction type-specific functions of other devices (e.g., the point of interaction device 130, the business management engine 120, the payment network 140, and/or the remote configuration device 150).

In block 512, the transaction management controller 102 modifies one or more of the transaction processing parameters of the dynamically loaded transaction processing module. Such modification(s) can be based on configuration data included in a parameter modification message received from a remote computing device such as, for example, the remote configuration device 150. The configuration data of the received parameter modification message can include rules, values, and/or settings that specify the modification(s) that are to be made to one or more of the transaction processing parameters of the dynamically loaded transaction processing module. As such, in some embodiments, the transaction management controller 102 in block 514 modifies one or more of the transaction processing parameters of the dynamically loaded transaction processing module by toggling "on" (e.g., activating or enabling) or toggling "off" (e.g., deactivating or disabling) the corresponding transaction processing parameters as a function of the configuration data.

In block 516, the transaction management controller 102 requests payment card data for the payment transaction from the POI device 130 based on the transaction processing parameters of the initialized transaction processing module. For example, in some embodiments, in block 518, the transaction management controller 102 manages selection options of the POI device 130 for the payment transaction based on the transaction processing parameters included in the initialized transaction processing module. As discussed, the transaction processing parameters of the initialized transaction processing module can be embodied as, or otherwise include, one or more rules or instructions for processing payment transactions that correspond to the payment transaction type.

In block 520, the transaction management controller 102 receives the requested payment card data from the POI device 130 based on the original and modified transaction processing parameters of the initialized transaction processing module. In some embodiments, the received payment card data includes a payment card number associated with a payment card used for the payment transaction. It should be appreciated, however, that the payment card data can include any other type of data associated with a payment transaction. In some embodiments, in block 522, the transaction management controller 102 receives any payment options selected by a consumer via the POI device 130.

In block 524, the transaction management controller 102 inserts or otherwise incorporates the transaction amount received from the business management engine 120 and the payment card data (e.g., the payment card number, etc.) received from the POI device 130 into a payment authorization request message. In some embodiments, the payment authorization request message can be embodied as a HTTP message. It should be appreciated, however, that the payment authorization request message can be embodied as any other type of message, in other embodiments.

In block 526, the transaction management controller 102 transmits the payment authorization request message to the payment network 140 based on the original and modified transaction processing parameters of the initialized transaction processing module. As discussed, the payment network 140 can include a payment gateway communicatively coupled thereto configured to facilitate the transaction management controller 102 in processing payment transactions, in some embodiments. The payment network 140 can be configured to communicate with an issuer processor and/or and issuer financial institution and, based on the payment authorization request message, generate a payment authorization response message. In block 528, the transaction management controller 102 receives the payment authorization response message from the payment network 140 (or a payment gateway communicatively coupled thereto). In some embodiments, the payment authorization response message can be embodied as a HTTP message. It should be appreciated, however, that the payment authorization response message can be embodied as any other type of message, in other embodiments.

Subsequently, in block 530, the transaction management controller 102 finalizes the payment transaction and, in some embodiments, the payment authorization response message with the POI device 130. For example, in some embodiments, the transaction management controller 102 can instruct the POI device 130 to capture a signature for the payment transaction. In such embodiments, the transaction management controller 102 can receive captured signature data from the POI device 130. Additionally, in such embodiments, the payment authorization response message can be modified or augmented to include a byte array of the captured signature data. Additionally or alternatively, in some embodiments, the transaction management controller 102 can, based on the original and modified transaction processing parameters of the initialized transaction processing module, instruct the POI device 130 to write payment transaction data or account data back to an integrated circuit payment card (e.g., an EMV payment card) used for a particular payment transaction.

In block 532, in some embodiments, the transaction management controller 102 transmits the finalized payment authorization response message to the business management engine 120 based on the original and later-modified transaction processing parameters of the initialized transaction processing module. In some embodiments, the business management engine 120 generates a receipt for the payment transaction based at least in part on, or otherwise as a function of, the finalized payment authorization response message received from the transaction management controller 102. In such embodiments, the business management engine 120 can be configured to print the generated receipt via a receipt printer communicatively coupled thereto.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods can be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and can be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions can be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for managing payment authorization request messaging for payment transactions, the method comprising:

receiving, by a transaction management controller, a payment vehicle type corresponding to a payment vehicle associated with a payment transaction initiated at a point of interaction (POI) device;

retrieving, by the transaction management controller and from a data storage device, a payment vehicle transaction processing module, wherein the payment vehicle transaction processing module is type-specific to the received payment vehicle type;

initializing, by the transaction management controller, the retrieved payment vehicle transaction processing module, wherein the payment vehicle transaction processing module defines one or more type-specific transaction processing parameters for processing payment transactions according to the received payment vehicle type by prescribing at least one of supported language settings, transaction gratuity features, transaction store and forward features, lane identification features, and lane initialization settings;

receiving, by the transaction management controller, payment vehicle data of the payment vehicle and a transaction amount of the payment transaction from the POI device based on initializing the payment vehicle transaction processing module;

inserting, by the transaction management controller, the payment vehicle data and the transaction amount into a payment authorization request;

automatically receiving, by the transaction management controller, a parameter modification message from a remote configuration device, wherein the parameter modification message includes configuration data to modify the one or more type-specific transaction processing parameters defined by the payment vehicle transaction processing module;

modifying, by the transaction management controller, the one or more type-specific transaction processing parameters according to the configuration data; and processing, by the transaction management controller, the payment authorization request according to the modified transaction processing parameters using the payment vehicle transaction processing module.

2. The method of claim 1, wherein processing the payment transaction further comprises:

transmitting, by the transaction management controller and to a payment network, a payment authorization request message based on the modified transaction processing parameters of the payment vehicle transaction processing module;

receiving, by the transaction management controller and from the payment network, a payment authorization response message for the payment authorization request message; and transmitting, by the transaction management controller and to a business management engine, the payment authorization response message based on the modified transaction processing parameters of the payment vehicle transaction processing module.

3. The method of claim 1, wherein the payment vehicle transaction processing module is one of a plurality of payment vehicle transaction processing modules retrievable by the transaction management controller.

4. The method of claim 1, wherein the data storage device is one of a local storage device of the transaction management controller or a remote storage device.

5. The method of claim 1, wherein the received payment vehicle type comprises one of a first payment vehicle type and a second payment vehicle type, and wherein the payment vehicle transaction processing module comprises one of a first payment vehicle transaction processing module that corresponds to the first payment vehicle type and a second payment vehicle transaction processing module that corresponds to the second payment vehicle type, wherein the method further comprises:

determining, by the transaction management controller, whether the received payment vehicle type is of the first payment vehicle type or the second payment vehicle type;

wherein initializing the payment vehicle transaction processing module comprises (i) initializing only the first payment vehicle transaction processing module based on a determination that the received payment vehicle type is of the first payment vehicle type or (ii) initializing only the second payment vehicle transaction processing module based on a determination that the received payment vehicle type is of the second payment vehicle type.

6. The method of claim 1, wherein receiving the payment vehicle type comprises receiving the payment vehicle type from a point of interaction device, and wherein the method further comprises:

managing, by the transaction management controller, selection options of the point of interaction device for the payment transaction; and receiving, by the transaction management controller and from the point of interaction device, selected options for the payment transaction.

7. A non-transitory computer-readable medium comprising a plurality of instructions stored thereon that in response to being executed by a transaction management controller, cause the transaction management controller to perform operations comprising:

receiving a payment vehicle type corresponding to a payment vehicle associated with a payment transaction initiated at a point of interaction (POI) device;

retrieving, from a data storage device, a payment vehicle transaction processing module, wherein the payment vehicle transaction processing module is type-specific to the received payment vehicle type;

initializing the retrieved payment vehicle transaction processing module, wherein the payment vehicle transaction processing module defines one or more type-specific transaction processing parameters for processing payment transactions according to the received payment vehicle type by prescribing at least one of supported language settings, transaction gratuity features, transaction store and forward features, lane identification features, and lane initialization settings;

receiving payment vehicle data of the payment vehicle and a transaction amount of the payment transaction from the POI device based on initializing the payment vehicle transaction processing module;

inserting the payment vehicle data and the transaction amount into a payment authorization request;

automatically receiving a parameter modification message from a remote configuration device, wherein the parameter modification message includes configuration data to modify the one or more type-specific transaction processing parameters defined by the payment vehicle transaction processing module;

modifying the one or more type-specific transaction processing parameters according to the configuration data; and processing the payment authorization request according to the modified transaction processing parameters using the payment vehicle transaction processing module.

8. The non-transitory computer-readable medium of claim 7, wherein processing the payment transaction further comprises:

transmitting, by the transaction management controller and to a payment network, a payment authorization request message based on the modified transaction processing parameters of the payment vehicle transaction processing module;

receiving, by the transaction management controller and from the payment network, a payment authorization response message for the payment authorization request message; and transmitting, by the transaction management controller and to a business management engine, the payment authorization response message based on the modified transaction processing parameters of the payment vehicle transaction processing module.

9. The non-transitory computer-readable medium of claim 7, wherein the payment vehicle transaction processing module is one of a plurality of payment vehicle transaction processing modules retrievable by the transaction management controller.

10. The non-transitory computer-readable medium of claim 7, wherein the data storage device is one of a local storage device of the transaction management controller or a remote storage device.

11. The non-transitory computer-readable medium of claim 7, wherein the received payment vehicle type comprises one of a first payment vehicle type and a second payment vehicle type, and wherein the payment vehicle transaction processing module comprises one of a first payment vehicle transaction processing module that corresponds to the first payment vehicle type and a second payment vehicle transaction processing module that corresponds to the second payment vehicle type, wherein the operations further comprise:

determining, by the transaction management controller, whether the received payment vehicle type is of the first payment vehicle type or the second payment vehicle type;

wherein initializing the payment vehicle transaction processing module comprises (i) initializing only the first payment vehicle transaction processing module based on a determination that the received payment vehicle type is of the first payment vehicle type or (ii) initializing only the second payment vehicle transaction processing module based on a determination that the received payment vehicle type is of the second payment vehicle type.

12. The non-transitory computer-readable medium of claim 7, wherein receiving the payment vehicle type comprises receiving the payment vehicle type from a point of interaction device, and wherein the plurality of instructions further cause the transaction management controller to perform operations comprising:

managing, by the transaction management controller, selection options of the point of interaction device for the payment transaction; and receiving, by the transaction management controller and from the point of interaction device, selected options for the payment transaction.

13. A system for managing payment authorization request messaging for payment transactions, the system comprising:

a transaction management controller comprising a processor executing instructions stored in memory, wherein the instructions cause the processor to perform operations comprising:

receiving a payment vehicle type corresponding to a payment vehicle associated with a payment transaction initiated at a point of interaction (POI) device;

retrieving, from a data storage device, a payment vehicle transaction processing module, wherein the payment vehicle transaction processing module is type-specific to the received payment vehicle type;

initializing the retrieved payment vehicle transaction processing module, wherein the payment vehicle transaction processing module defines one or more type-specific transaction processing parameters for processing payment transactions according to the received payment vehicle type by prescribing at least one of supported language settings, transaction gratuity features, transaction store and forward features, lane identification features, and lane initialization settings;

receiving payment vehicle data of the payment vehicle and a transaction amount of the payment transaction from the POI device based on initializing the payment vehicle transaction processing module;

inserting the payment vehicle data and the transaction amount into a payment authorization request;

automatically receiving a parameter modification message from a remote configuration device, wherein the parameter modification message includes configuration data to modify the one or more type-specific transaction processing parameters defined by the payment vehicle transaction processing module;

modifying the one or more type-specific transaction processing parameters according to the configuration data; and processing the payment authorization request according to the modified transaction processing parameters using the payment vehicle transaction processing module.

14. The system of claim 13, wherein processing the payment transaction further comprises:

transmitting, by the transaction management controller and to a payment network, a payment authorization request message based on the modified transaction processing parameters of the payment vehicle transaction processing module;

receiving, by the transaction management controller and from the payment network, a payment authorization response message for the payment authorization request message; and transmitting, by the transaction management controller and to a business management engine, the payment authorization response message based on the modified transaction processing parameters of the payment vehicle transaction processing module.

15. The system of claim 13, wherein the payment vehicle transaction processing module is one of a plurality of payment vehicle transaction processing modules retrievable by the transaction management controller.

16. The system of claim 13, wherein the data storage device is one of a local storage device of the transaction management controller or a remote storage device.

17. The system of claim 13, wherein receiving the payment vehicle type comprises receiving the payment vehicle type from a point of interaction device, and wherein the instructions further cause the transaction management controller to perform operations comprising:

managing, by the transaction management controller, selection options of the point of interaction device for the payment transaction; and receiving, by the transaction management controller and from the point of interaction device, selected options for the payment transaction.

* * * * *